United States Patent [19]

Ochiai

[11] Patent Number: 4,863,219
[45] Date of Patent: Sep. 5, 1989

[54] ARRANGEMENT FOR MOUNTING RECLINING DEVICE TO SEAT

[75] Inventor: Susumu Ochiai, Akishima, Japan

[73] Assignee: Tachi-S Co., Ltd., Toyko, Japan

[21] Appl. No.: 253,432

[22] Filed: Oct. 5, 1988

[30] Foreign Application Priority Data

Oct. 26, 1987 [JP] Japan .................. 62-163440[U]

[51] Int. Cl.[4] .............................................. A47C 7/00
[52] U.S. Cl. ................................... 297/443; 297/355
[58] Field of Search ................ 297/443, 355; 248/393, 248/429, 430

[56] References Cited

U.S. PATENT DOCUMENTS

| 4,673,217 | 6/1987 | Nishiyama et al. | 297/473 |
| 4,676,555 | 6/1987 | Tokugawa | 297/473 |
| 4,756,503 | 7/1988 | Fujita | 297/473 |
| 4,775,126 | 10/1988 | Yokoyama | 297/473 |
| 4,775,186 | 10/1988 | Nishino | 248/429 X |

FOREIGN PATENT DOCUMENTS 3631791 4/1987 Fed. Rep. of Germany ...... 297/473

Primary Examiner—James T. McCall
Attorney, Agent, or Firm—Browdy and Neimark

[57] ABSTRACT

An arrangement for mounting a reclining device to a seat, wherein the seat is provided with a reclining device having a lower bracket formed with a bent intermediate part, thus defining a recessed lower part therein, a slide rail device under the seat, and a seat belt anchor, and wherein, on the slide rail device, erected is a base bracket having a bent support portion formed at its upper end. The lower bracket and seat belt anchor are firmly secured to the base bracket, such that the bent support portion of the base bracket is juxtaposed on the bent intermediate part of the lower bracket. Accordingly, a downward load applied to the lower bracket and an upward pulling force to the seat belt anchor are counterbalanced at those juxtaposed bent intermediate part and bent support portion into a nil, whereby the seat is protected against deformation.

5 Claims, 2 Drawing Sheets

ARRANGEMENT FOR MOUNTING RECLINING DEVICE TO SEAT

BACKGROUND OF THE INVENTION

1. Field of the Invention

The present invention relates to an arrangement for mounting a reclining device to an automotive seat, and particularly is directed to providing an improved arrangement for mounting the reclining device having a lower bracket to a base bracket erected on a seat adjusting device provided under the seat.

2. Description of the Prior Art

In most instances, an automotive seat is mounted on a slide rail device fixed on the floor of the automobile, for the purpose of permitting the forward/backward positional adjustment of the seat. A reclining device is also mounted on that seat construction such that its upper bracket is fixed on the lateral wall of the seat back and its lower bracket is fixed to the base bracket erected on the slide rail device, for permitting the inclination adjustment of the seat back relative to the seat cushion. It is, however, quite often the case that the lower bracket of the reclining device is in its lower half area formed with an integrally inwardly recessed portion which is recessed inwardly of the seat, extending generally in parallel with the upper half area of the lower bracket, thus defining a difference in level between the upper and lower halves of the lower bracket, in order to match a seat of the type wherein the slide rail device is smaller in width than the seat back as well as to avoid the interference or contact of the lower bracket with a surrounding projected part the of automobile body, a center console, a raised center portion formed in the floor of automobile, or the like. Such a reclining device is vulnerable from a dynamic viewpoint due to the lower bracket thereof being of the foregoing level-difference structure. This is because, when a great downward load is applied to the lower bracket in a collision accident, the bent intermediate part integrally formed between the upper and lower halves of the lower bracket is easily deformed by that downward load, and consequently the lower bracket is deformed, bringing about failure or trouble to the reclining device. A solution to this problem has been achieved by increasing the thickness of the lower bracket of the reclining device for reinforcement purposes.

Additionally, in the case of a seat belt anchor being mounted on the seat cushion, then an upwardly pulling force is applied to the mounting area of the seat belt anchor in a collision accident, and there is a further need to consider a reinforcing arrangement for such seat belt anchor mounting area.

For the above reasons, the conventional reclining devices require a separate reinforcing means to obviate the foregoing dynamically weak points, and result in the increase of reinforcing members and thus undesired increase of the whole seat.

SUMMARY OF THE INVENTION

With the above-mentioned drawbacks in view, the present invention is made, taking into account the above-discussed inwardly-recessed structure of lower bracket of reclining device, and has for its purpose the provision of a novel arrangement for mounting a reclining device to a seat, which eliminates the deformation of the lower bracket associated with the reclining device, with a much simplified construction and without requiring any separate reinforcing means.

In achievement of such purpose, in accordance with the present invention, on a slide rail device fixed on the floor, a base bracket is erected fixedly whose upper end is integrally formed with an outwardly bent support part. A reclining device applied in the present inention is similar to the foregoing one, and thus is composed of an upper bracket connected to the lower part of the seat back of the seat and a lower bracket which consists of a vertical upper area connected rotatably, pivotally to the upper bracket, an inwardly recessed lower area which extends continuously from the upper area in a manner being recessed inwardly of the seat and extending vertically in parallel with the upper area, defining a difference in level between the upper and lower areas within the lower bracket, and an inwardly bent intermediate part integrally formed between those upper and lower areas.

Importantly, in the invention, the vertical part as well as the outwardly bent support part associated with the base bracket are respectively juxtaposed on the inwardly recessed lower area and the inwardly bent intermediate part associated with the lower bracket of the reclining device, and a seat belt anchor is firmly secured on the vertical part of the base bracket. A securing means, such as a bolt and nut, passes through those inwardly recessed lower areas of the lower bracket, vertical part of the base bracket, and seat belt anchor, so as to firmly secure them together. Accordingly, it is seen that, when in a collision accident, a downward load is applied from the seat back to the seat cushion and an upward load is applied from the seat belt to the seat belt anchor, the outwardly bent support part of the base bracket receives the downward load, supporting the inwardly bent intermediate part of the lower bracket of the reclining device, while at the same time, receiving the upward load, whereupon the juxtaposed outwardly bent support part and inwardly bent intermediate part cooperate to serve as means for counterbalancing the forces exerted by the two upward and downward loads into a nil force, thus nullifying the loads in the lower bracket and base bracket, and preventing the deformation of those brackets.

In one aspect of the present invention, it may be arranged that a small clearance is provided between the outwardly bent support part of the base bracket and the inwardly bent intermediate part of the lower bracket, so as to normally retain the outwardly support part in a non-use position.

With the above structure, there is no need to provide a special or separate reinforcing means to the bent portion of the lower bracket of the reclining device, and because of its structural simplicity, the weight of the seat becomes far more lighter.

BRIEF DESCRIPTION OF THE DRAWINGS

FIG. 3 (B) is a partially enlarged sectional view, which shows the state in which a downward load (F1)

Figure 3A:
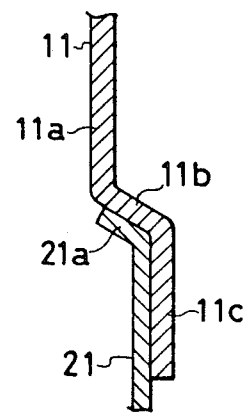
FIG. 3 (A) is a partially enlarged sectional view, showing an outwardly bent support part of a base bracket and an inwardly bent intermediate part of a lower bracket of a reclining device.
Figure 3B:
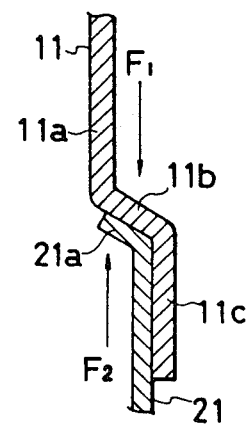

and an upward load (F2) are applied to the outwardly bent support part and inwardly bent intermediate part;

FIG. 4 (A) is a partially enlarged sectional view, showing another embodiment in which a small clearance is provided between the support part and intermediate part as in the FIGS. 3(A) and 3(B); and FIG. 4 (B) is a partially enlarged sectional view, which shows the state in which a downward load (F1) and an upward load (F2) are applied to both parts as in the FIG. 4 (A).

DETAILED DESCRIPTION OF PREFERRED EMBODIMENTS OF THE INVENTION

Figure 1:
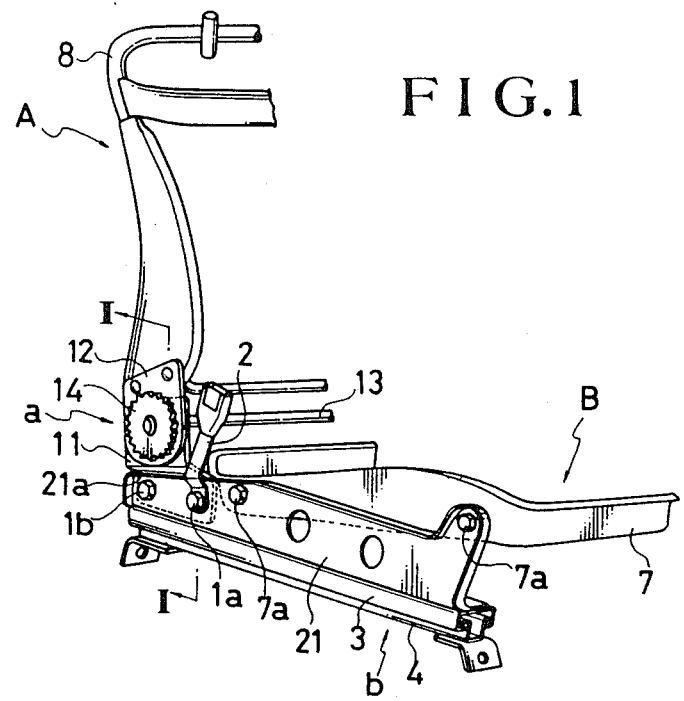
FIG. 1 is a partially cut-away perspective view of a seat framework in which the present invention applies.
Figure 2:
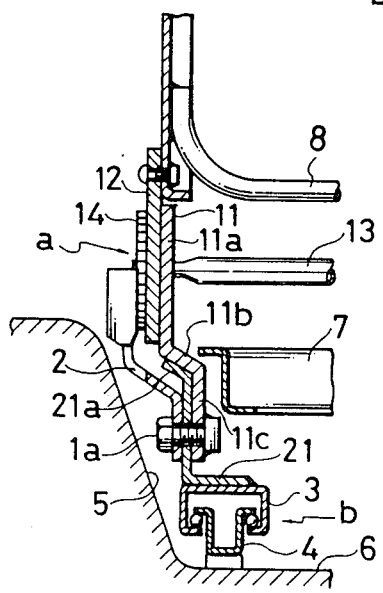
FIG. 2 is a sectional view taken along the line I—I in the FIG. 1, showing a principal part of the present invention.

Referring to FIGS. 1 through 3, one embodiment of the present invention is illustrated. FIG. 1. shows a seat frame comprising a back frame (6) for a seat back (A) and a seat cushion frame (7) for a seat cushion (B). Designation (a) denotes a reclining device which has an upper bracket (12) fixed to the lateral bar section of the back frame (6) and a lower bracket (11) firmly secured to the rear region of a base bracket (2) erected on a slide rail device (d). As shown in FIG. 2, the lower bracket (11) is at its upper area (11a) rotatably, pivotally secured to the upper bracket (12), with one end of the connecting rod (13) being inserted at the pivot center point of those lower and upper brackets (11)(12), so that the upper bracket (12) is free to rotate about the pivot center point. Numeral (14) denotes a lock gear forming one of a known locking mechanism for locking/unlocking the reclining device (a), and although not shown, a suitable lock pawl is engaged with the lock gear (14) and operatively connected with other required elements forming the locking mechanism.

The reclining device (a) is a commonly known reclining device of the type so designed that its lower bracket (11) is in its lower part formed with an inwardly recessed area (11c), defining a level difference in the midway point of the lower bracket (11), as best seen from FIG. 2. This particular type of reclining device (a) is employed for a seat wherein the seat slide rail used is smaller in width than the seat back of the seat, so as to avoid the interference or contact of the lower bracket (11) with a surrounding part of automobile body. More specifically, referring to FIG. 2, the lower bracket (11) is so formed as to have a vertical upper area (11a), an inwardly recessed lower area (11c) which is recessed inwardly of the seat frame in a direction towards the seat cushion frame (7), extending continuously, downwardly from the vertical upper area (11a) in parallel therewith, and an inwardly bent intermediate part (11b) integrally formed between the vertical upper area (11a) and inwardly recessed lower area (11c), whereupon as shown a difference in level is created between the vertical upper area (11a) and inwardly recessed lower area (11c). The inwardly recessed lower area (11c) is fixed to the slide rail device (21) via the base bracket (21), which will be described in detail later. Thus, in the illustrated embodiment, since the slide rail device (21) is fixed on the floor (6) and disposed adjacent to one of the downwardly diverging lateral walls of a central console (5) which extends centrally of automobile body (not shown), the provision of the inwardly recessed area (11c) keeps the lower bracket (11) away from the sloping lateral wall of the central console (5), thereby avoiding the interference or contact of the lower bracket (11) with the central console (5).

The foregoing slide rail device (b) is one of the known seat adjusting devices for permitting the forward/backward positional adjustment of the seat and comprises a lower rail (4) fixed on the floor (6) and an upper rail (3) slidably fitted in the lower rail (4).

On the upper surface of the upper rail (3), the base bracket (21) is welded which is of a substantially L-shaped configuration in section. Specifically, the base bracket (21) comprises a horizontal base portion (21c) welded on the upper surface of the upper rail (3), a vertical portion (21b) extending uprightly from the horizontal base portion (21c) and an outwardly bent support portion (21a) formed in the upper end of the base bracket (21). As illustrated, the outwardly bent support portion (21a) and the vertical portion (21b), associated with the base bracket (21), are respectively juxtaposed on the inwardly bent intermediate part (11b) and the inwardly recessed lower area (11c), associated with the lower bracket (11), in such a manner that the former elements of the base bracket (21) are disposed outside the latter elements of the lower bracket (11). Hence, the outwardly bent support portion (21a) underlies the inwardly bent intermediate part (11b) in close contact therewith. In the embodiment shown, both support portion (21a) and intermediate part (11b) are bent in an oblique manner at the same angle relative to their respective vertical portion (21b) and vertical upper area (11a).

Rearwardly of the base bracket (21) and to the vertical portion (21b) thereof, the lower bracket (11) is firmly secured at its inwardly recessed lower area (11c) by means of two securing bolts (1a) (1b). The securing bolts (1a)(1b) pass through the vertical portion (21b) of the base bracket (21) and the inwardly recessed lower area (11c) of the lower bracket (11).

A seat belt anchor (2) is at its lower end secured by the first securing bolt (1a) to the base bracket (21), as shown. The seat belt anchor (2) is adapted for detachably connecting with the free end of a seat belt (not shown) which is used to restrain the body of an occupant of the seat.

Although not shown, there is provided another reclining device which is same as the foregoing one (a) at the other corresponding side of the seat.

On the base bracket (21), the seat cushion frame (7) is fixed which is of a pan type, by means of securing bolts (7a).

Now, referring to FIGS. 3(A) and 3(B), when in a collision accident, a great downward load (F1) is applied from an occupant on the seat to the back frame (6) of the seat back (A), and further transmitted therefrom to the lower bracket (11) of the reclining device (a) and the base bracket (21) on the slide rail device (a), while at the same time, a great upward pulling force (F2) is applied from the occupant, who is about to be thrown out forwardly, to the seat belt, and transmitted via the seat belt anchor (2) and first bolt (1a) to the vertical portion (21b) of the base bracket (21). Thus, the downward load (F1) is exerted upon the lower bracket (11) whereas the upward pulling force (F2) is exerted upon the base bracket (21), at that moment.

It is, accordingly, appreciated that the downward load (F1) is received at the inwardly bent intermediate part (11b) and the upward pulling force (F2) is received at the outwardly bent support portion (21a), and that, owing to the juxtaposition of those two elements (11b)(21a), the two opposingly directed forces (F1)(F2) are exerted on each other and counter-cancel the forces to yield a nil force with the result that no force exists at the lower bracket (11) and base bracket (21).

Figure 4A:
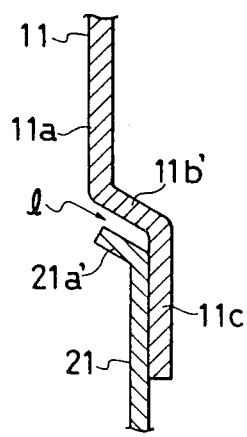
Figure 4B:
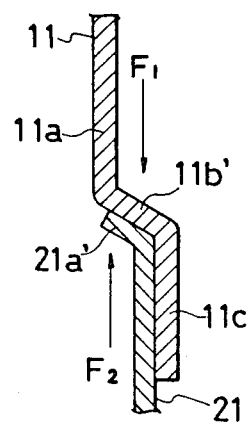

FIGS. 4(A) and 4(B) show another embodiment of the present invention, wherein all the parts and elements are identical to those of the above-stated first embodiment, but, as shown, there is provided a small clearance (l) between the inwardly bent intermediate part (11b') of the lower bracket (11) associated with the reclining device (a) and the outwardly bent support portion (21a') of the base bracket (21) on the slide rail device (b). By being so constructed, the outwardly bent support portion (21a') is normally kept from contact with the mating inwardly bent intermediate part (11b'), thus being situated at a non-use position. Accordingly, in the case of a collision accident, as illustrated in FIG. 4(B), similarly to the above-discussed dynamic action in the first embodiment, a great downward load (F1), which is applied from the back frame (6), is exerted on the inwardly bent intermediate part (11b') and at the same time a great upward pulling force (F2), which is applied from the seat belt anchor, is exerted on the outwardly bent support portion (21a'). As a result, contact is established between those two elements (11b')(21a'), due to their slight deformation, whereupon the two opposingly directed forces (F1)(F2) are met with each other at thus-juxtaposed inwardly bent intermediate part (11b') and outwardly bent support portion (21a'), and counter-balance into a nil force, with the result that no force or load exists at the lower bracket (11) and base bracket (21).

With the above-described structure, in accordance with the present invention, two opposing forces or loads caused from the seat back and seat belt, respectively, in a collision accident, are counter-balanced into a nil force, by virtue of the juxtaposition or contact of those inwardly bent intermediate part (11b) or (11b') associated with the lower bracket (11) and the outwardly bent support portion (21b) or (21b') associated with the base bracket (21). Accordingly, even in the case of a collision, no deformation is caused in the lower bracket (11) of the reclining device (a), base bracket (21) on the slide rail device (b), or other adjacent parts of the seat. This eliminates the need for increasing the thickness of the lower bracket (11) and base bracket (21), and adding a separate reinforcing member thereto. This permits a far reduction of the weight of the seat as compared with the aforementioned prior art, and the mere formation of the outwardly bent support portion (21b) or (12b') on the base bracket (21) results in simplifying the assemblage of the seat, which greatly contributes to the facilitation of seat assembling processes at a low costs.

Furthermore, the fact that the reclining device (a) is directly mounted on the base bracket (21) fixed on the slide rail device (b), is advantageously effective in avoiding the transmission of the loads to the seat cushion frame (7), and letting out the loads to the floor (6) of the automobile. Thus, the seat on the whole is protected against a damage due to the loads.

While having described as above, it should be understood that the present invention is not limited to the illustrated embodiments, but other various modifications, replacements and additions may structurally be possible without departing from the spirit and scope of the appended claims for the invention.

What is claimed is:

1. An arrangement for mounting a reclining device to a seat, in which said seat includes a seat back frame and a seat cushion frame, with a slide rail device provided under said seat, and said reclining device has an upper bracket fixed to said seat back frame and a lower bracket having a bent intermediate part and recessed area extending continuously from said bent intermediate part, said arrangement comprising:
   a base bracket fixedly mounted on said slide rail device, said base bracket being at its upper end formed integrally with a bent support portion;
   a seat belt anchor adapted for detachably connecting with a free end of a seat belt; and
   at least one securing bolt,
   wherein, said lower bracket of said reclining device and said seat belt anchor are firmly secured to said base bracket by means of said securing bolt in such a manner that said base bracket is juxtaposed on said recessed area of said lower bracket of said reclining device, with said bent upper support part of said base bracket being juxtaposed on said bent intermediate part of said lower bracket.

2. The arrangement as defined in claim 1, wherein there is provided a slight clearance between said bent intermediate part of said base bracket and said bent support part of said lower bracket of said reclining device.

3. The arrangement as defined in claim 1, wherein said bent intermediate part of said lower bracket is so formed that it is bent in an oblique manner in a direction inwardly of said seat, wherein said recessed area of said lower bracket is recessed inwardly of said seat, and wherein said base bracket is juxtaposed on said inwardly recessed area of said lower bracket, and said bent support portion of said base bracket is so bent outwardly as to be juxtaposed on and underlie said inwardly bent intermediate part of said lower bracket.

4. The arrangement as defined in claim 3, wherein there is provided a slight clearance between said inwardly bent intermediate part of said base bracket and said outwardly support part of said lower bracket of said reclining device.

5. The arrangement as defined in claim 1, wherein the seat cushion frame is firmly secured to said base bracket.

* * * * *